(12) United States Patent
Smith

(10) Patent No.: US 12,310,465 B1
(45) Date of Patent: May 27, 2025

(54) BAIL ALIGNMENT MARKING DEVICE

(71) Applicant: David Lee Smith, North Bend, OR (US)

(72) Inventor: David Lee Smith, North Bend, OR (US)

( * ) Notice: Subject to any disclaimer, the term of this patent is extended or adjusted under 35 U.S.C. 154(b) by 585 days.

(21) Appl. No.: 17/826,325

(22) Filed: May 27, 2022

Related U.S. Application Data

(60) Provisional application No. 63/212,491, filed on Jun. 18, 2021.

(51) Int. Cl.
*B23Q 3/10* (2006.01)
*A44C 27/00* (2006.01)

(52) U.S. Cl.
CPC .............. *A44C 27/00* (2013.01); *B23Q 3/104* (2013.01)

(58) Field of Classification Search
CPC ................................ A47C 27/00; B23Q 3/104
USPC ........... 33/18.1, 32.1, 32.2, 32.3, 32.7, 41.1, 33/41.6, 568, 573, 562
See application file for complete search history.

(56) References Cited

U.S. PATENT DOCUMENTS

| | | | | |
|---|---|---|---|---|
| 2,342,525 A * | 2/1944 | Berry | ..................... | G03B 27/28 355/74 |
| 3,888,477 A * | 6/1975 | Tate | ......................... | E04F 21/26 269/82 |
| 4,228,592 A * | 10/1980 | Badger | .................... | H02G 1/00 33/528 |
| 4,519,143 A * | 5/1985 | Correlli | ..................... | B65H 7/04 33/669 |
| 4,531,296 A * | 7/1985 | Veeze | ...................... | B25H 7/04 33/468 |
| 4,584,779 A * | 4/1986 | Wakamatsu | ............ | B43L 7/125 D10/65 |
| 4,679,328 A * | 7/1987 | Saad | ...................... | B43L 13/041 33/447 |
| 4,707,930 A * | 11/1987 | Sugiura | ................. | B41F 27/005 33/623 |
| 5,048,195 A * | 9/1991 | Leonov | .................... | G01B 5/24 33/645 |
| 5,105,552 A * | 4/1992 | Bielle | .................. | G01B 5/0002 33/573 |
| 5,123,174 A * | 6/1992 | Noguchi | .............. | G01B 5/0004 269/73 |
| 5,271,305 A * | 12/1993 | Peters | .................... | B26D 1/045 83/578 |
| 5,379,669 A * | 1/1995 | Roedig | .................. | B23Q 3/007 83/435.14 |

(Continued)

*Primary Examiner* — George B Bennett

(57) ABSTRACT

The present invention is used to mark the location on a piece of jewelry being constructed where the bail or embellishments are to be placed. It uses a stationary vee-shaped stop and a vee-shaped planar sliding marking guide to clamp the jewelry piece by pressing against the bezel that forces the jewelry piece into a position to be marked or scribed on front and/or back of the piece. This allows slots where the marking tool is placed to be perfectly aligned with the centerline of the bezel. The sliding marking guide relies on the clamping force exerted typically by rubber bands or springs, to force the jewelry piece into position using a guillotine effect. To assure the mark on the work piece is clean and precise, the clamping force is applied to the moving marking guide which lays flat against the back of the piece being marked. The mark is typically applied with a marking pen or a scribe.

10 Claims, 4 Drawing Sheets

(56) References Cited

U.S. PATENT DOCUMENTS

| | | | | |
|---|---|---|---|---|
| 5,394,617 A * | 3/1995 | Tucker | G02C 13/005 | 33/644 |
| 5,396,710 A * | 3/1995 | Battaglia | B25H 7/02 | 33/481 |
| 5,446,969 A * | 9/1995 | Terenzoni | B25H 7/00 | 33/421 |
| 6,182,371 B1 * | 2/2001 | Newman | B23Q 9/0042 | 144/144.1 |
| 6,182,549 B1 * | 2/2001 | Albright | B26D 7/015 | 269/313 |
| 6,195,904 B1 * | 3/2001 | Greer | E04F 21/0076 | 33/526 |
| 6,941,605 B2 * | 9/2005 | McCreesh | B26B 11/00 | 7/164 |
| 6,944,964 B1 * | 9/2005 | Easter | G01B 3/14 | 33/528 |
| 7,086,171 B2 * | 8/2006 | Lawson | G01B 3/14 | 33/562 |
| 7,263,777 B2 * | 9/2007 | Adams | G01N 3/46 | 33/32.6 |
| 7,568,415 B2 * | 8/2009 | West | B26F 1/3853 | 83/745 |
| 8,122,609 B2 * | 2/2012 | Farr | E04F 21/0076 | 33/420 |
| 8,549,767 B2 * | 10/2013 | Brady | B43L 7/027 | 33/645 |
| 8,793,856 B2 * | 8/2014 | Werner | B64F 5/60 | 33/645 |
| 11,097,413 B2 * | 8/2021 | Solberg | E04F 21/0076 | |
| 11,780,260 B1 * | 10/2023 | McGee | B43L 13/028 | 33/474 |
| 2023/0182499 A1 * | 6/2023 | Stein | B43L 13/026 | 33/18.1 |
| 2023/0219362 A1 * | 7/2023 | Skillicorn | B25H 7/02 | 33/197 |

* cited by examiner

BAIL ALIGNMENT MARKING DEVICE

BACKGROUND OF THE INVENTION

The present invention is in the technical field of soldering, welding, and gluing, and more particularly in the technical field of material marking devices. And more particularly the present invention is in the technical field of jewelry tools.

Typically, in the previous art, when trying to mount a workpiece such as an oval gem into an oval bezel, most people rely on processes and tools that require the user to guess where the centerline of the oval bezel is located on the front of the workpiece, then mark that point on the front of the workpiece, then flip it over and guess where to mark the back so it is opposite of the front mark, in order to precisely place the bail. The purpose of this invention is to eliminate the guesswork.

PRIOR ART

U.S. Pat. No. 2,439,346A Sep. 2, 1944 PARALLEL RULER AND METHOD OF MAKING THE SAME, NASH JAMES

U.S. Pat. No. 3,094,784 Nov. 12, 1958 DRAFTING INSTRUMENT, GENEVIEVE D. VAN DYKE, VAN NUYS, CALIF

U.S. Pat. No. 2,720,706A 1952 DRAFTING TEMPLATE, MAUNO W LAINE

20100102039 Apr. 29, 2010, GEMSTONE POSITIONING FIXTURE, WAGNER.

U.S. Pat. No. 234,560 Nov. 16, 1880 TOOL FOR JWELERS USE, L.G.

U.S. Pat. No. 4,535,979 Aug. 20, 1985, ALIGNMENT TOOL FOR PIECE WORK, JAMES PAARMANN

SUMMARY OF THE INVENTION

In accordance with preferred embodiments of the invention, a tool is provided for aligning a work piece that has a raised area, e.g. such as a bezel, that is symmetric about a centerline. The purpose of the tool is to align the work piece so that it can be marked along a line parallel with that centerline. The tool has a first end housing and a second end housing that are attached to a fixed plate. The fixed plate has a rectangular shape having a first end attached to the first end housing, with the fixed plate having a symmetric vee-shaped cutout opposite the first end creating a first set of edges in the vee-shaped cutout. The vee-shaped cutout has an apex pointing toward the first end housing and defining a first direction, and the fixed plate has a plurality of elongated slots parallel with the first direction through which a marking device can mark the workpiece. At least one of the plurality of elongated slots is located directly in line with the apex of the vee-shaped cutout. The fixed plate further comprises two side rails, each side rail attached to the first end housing and to the second end housing, wherein the two side rails are parallel with the first direction and extend past the vee-shaped cutout in a direction opposite the first direction with the vee-shaped cutout therebetween. Each of the side rails has a channel therein for accommodating a sliding plane. The sliding plane extends between the side rails and has a symmetric vee-shaped cutout on one end creating a set of edges in the vee-shaped cutout of the sliding plane, the set of edges of the sliding plane hereinafter called a second set of edges. The vee-shaped cutout on the sliding plane is oriented in a direction opposite the vee-shaped cutout on the fixed plate. The sliding plane has a plurality of elongated slots in alignment with the plurality of elongated slots in the fixed plate. The sliding plane is moveably captured in the channels in the side rails, and the channels are configured to enable the sliding plane to slide under the fixed plate between the side rails in a direction parallel to the first direction, wherein the sliding plane can be moved relative to the fixed plate to create an open area between the vee-shaped cutout on the sliding plane and the vee-shaped cutout on the fixed plate. The open area between the cutouts is where the raised area of the work piece can be held in place between the first set of edges and the second set of edges. Also in the preferred mode a restraining element, such as one or more stretchable bands or springs, is provided to create a force in the first direction on the sliding marking guide to hold the raised area of the workpiece in place between the edges of the fixed plate and the sliding marking guide.

In the preferred mode, the tool further includes a floating marking guide located above the fixed plate, the floating marking guide having a flat side facing the fixed plate and a second side opposite the flat side. The floating marking guide has a first end and a second end, with the first end of the floating marking guide moveably captured inside the first end housing, thereby permitting motion of the first end of the floating marking guide perpendicular to the fixed plate. Similarly, the second end of the floating marking guide is moveably captured inside the second end housing, thereby permitting motion of the second end of the floating marking guide perpendicular to the fixed plate. The floating marking guide also has a plurality of elongated slots aligned with the plurality of slots on the fixed plate and the plurality of slots on the sliding marking guide.

To keep a downward pressure on the floating marking guide, the tool further includes a spring on each end, one spring captured between the floating marking guide and the first end housing, and the other spring captured between the floating marking guide and the second end housing. The springs are captured in a way to only permit vertical motion of the floating marking guide, so as to keep the elongated grooves on the fixed plate and the sliding plane in alignment with the elongated grooves on the floating marking guide.

DETAILED DESCRIPTION OF THE INVENTION

Figure 1:
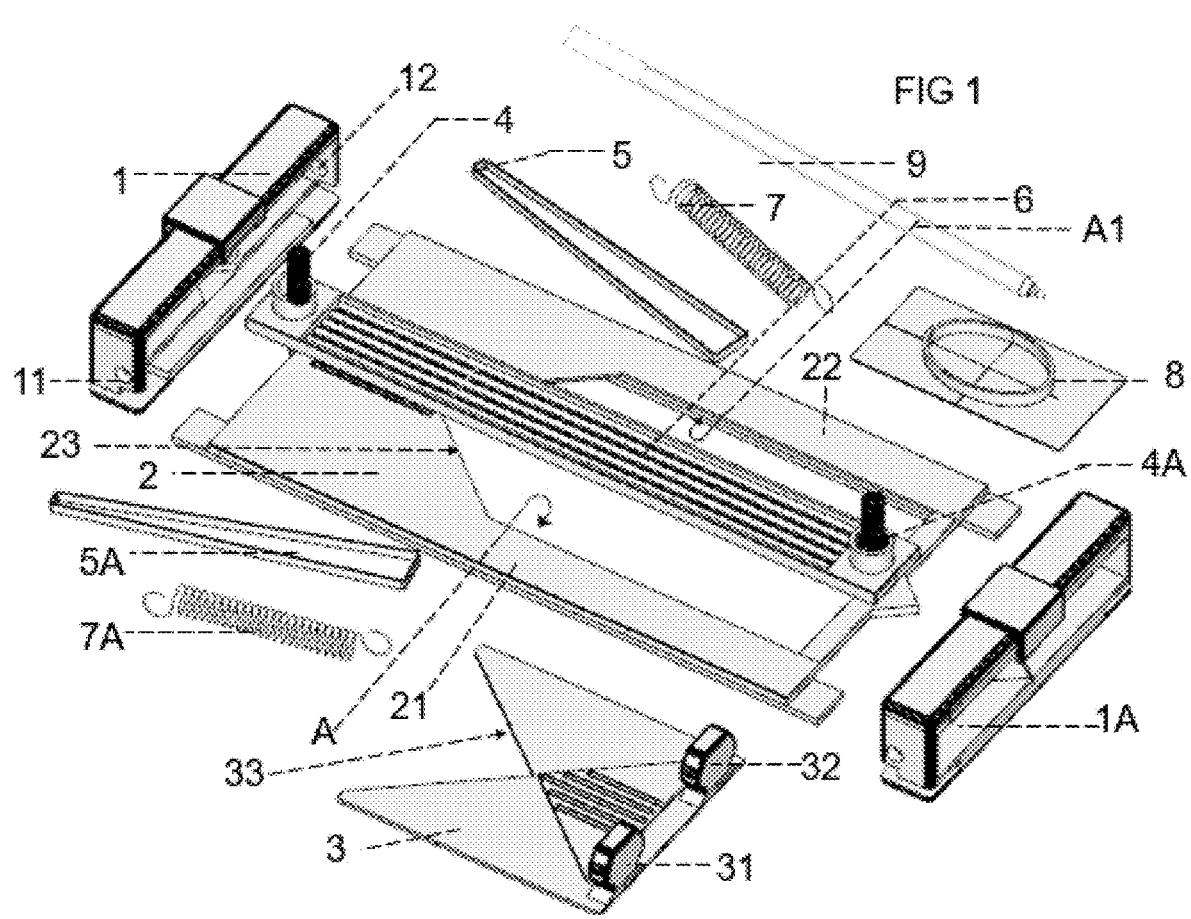
FIG. 1 shows and exploded view of all the parts of the invention, the marking tool and the work piece.

As shown in FIG. 1 of the preferred embodiment of the invention, parts 1 thru 7 are all components of the invention, whereas a work piece 8 and a marking device 9 are not. An end part 1 and an end part 1A are two vertical identical parts that provide support, alignment and spring enclosure for a spring 4 and spring 4A that are attached to a floating marking guide 6, which sits above a main body 2. Floating marking guide 6 is typically rectangular in shape with a plurality of elongated slots running substantially the full length of the rectangle. When assembled, each of end parts 1 and 1A is connected to main body 2. Main body 2 is substantially planar and has a top side shown in FIG. 1 and a bottom side shown in FIG. 2. The main body 2 is typically rectangular in shape and has two parallel side rails 21 and 22 with a symmetric vee-shaped cutout 23 on one end, between side rails 21 and 22, with the point of the vee preferably at the midpoint between the rails. Sliding marking guide 3 is planar with a rectangular shape with a vee-shaped cutout 33 on one end that has the opposite orientation of the vee-shaped cutout 23 of the main body 2. Sliding marking guide 3 is used to align the work piece 8 in the main body 2 in preparation for marking. Two stretchable bands 5 and 5A (or alternatively extension springs 7 and 7A) connected to sliding guide 3 via attachment elements 31 and 32 as shown in FIG. 3 are used to provide a clamping force on the work piece 8 to push it into position in the main body 2. The main body 2 has two channels, channel A on the same side as side rail 21 and channel A1 on the same side as side rail 22, to capture the sliding marking guide 3 between the rails (Shown in more detail in FIG. 4). The marking tool 9 is typically a pen or scribe used to make a mark on the work piece 8, and the work piece 8 typically has a raised area, such as a bezel, that is symmetric about a centerline. All parts of the embodiment other than the springs and stretchable bands are typically made of plastic, e.g. such as might be used in a 3D printer, although other materials could be used as well.

Figure 2:
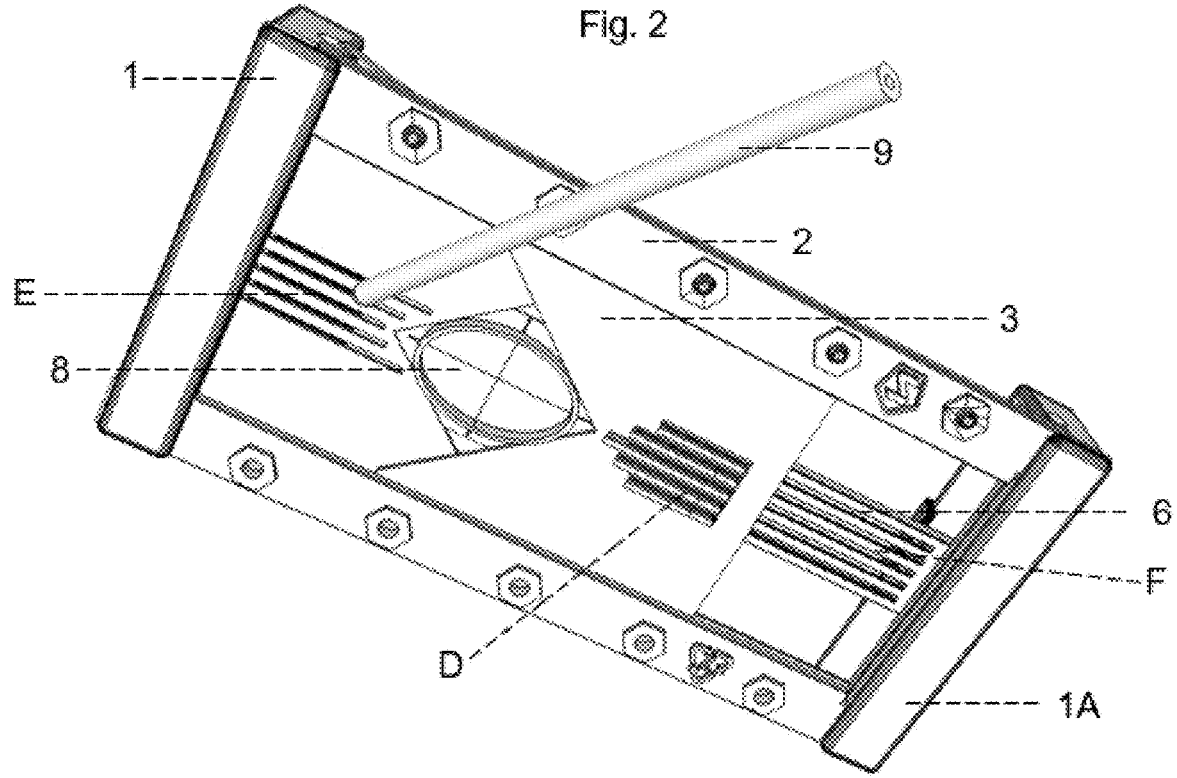
FIG. 2 shows a bottom isometric view of the invention with marking tool making a mark on the work piece.
Figure 3:
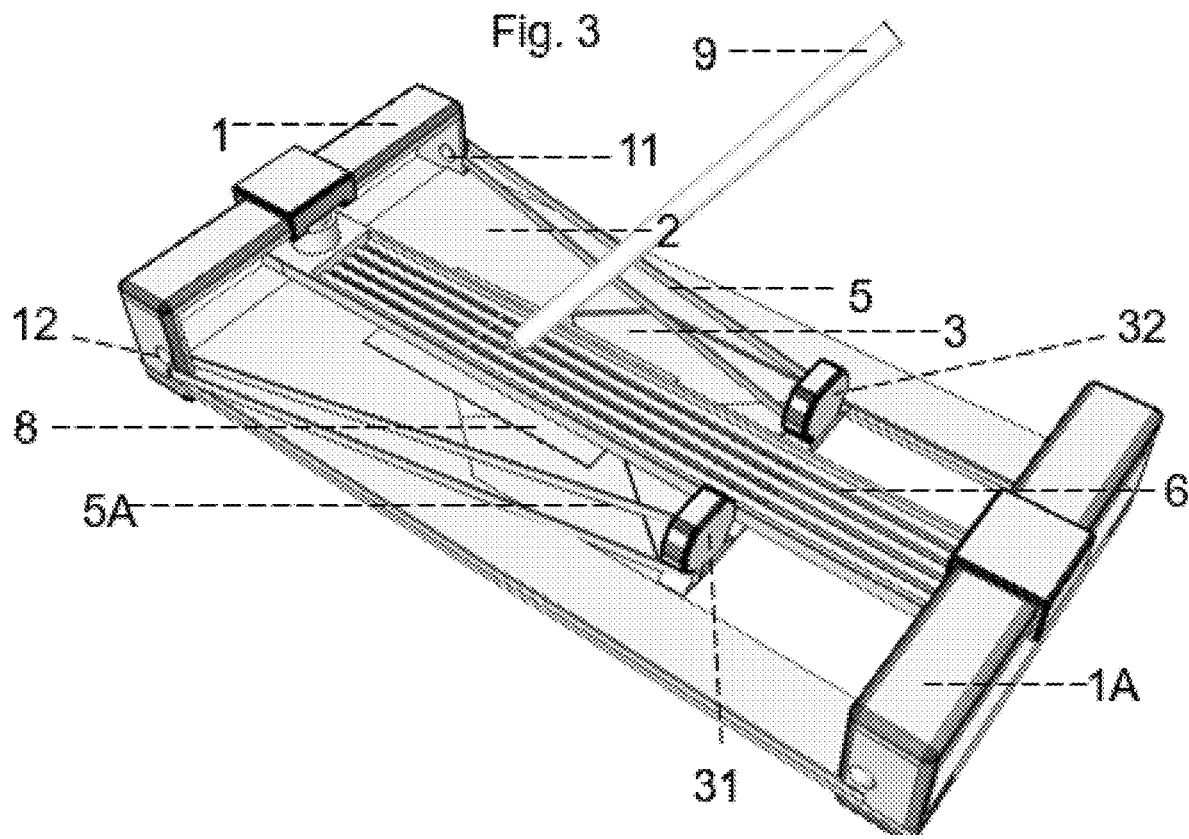
FIG. 3 shows a top isometric view of invention with the marking tool making a mark on work piece.

Shown in more detail in FIG. 2 is the bottom of the invention with both end pieces 1 and 1A connected to the main body 2. The sliding marking guide 3 is in position to clamp work piece 8 into main body 2 which forces correct alignment for marking with marking tool 9. Marking tool 9 is shown marking the front side of the work piece 8 thru elongated slots E located in main body 2. The elongated slots E in main body 2 are in alignment with the elongated slots F in floating marking guide 6.

Illustrated in further detail in FIG. 3 is the isometric view of the top of the embodiment showing the marking tool 9 in position marking the back side of the work piece 8. As illustrated, the work piece 8 is typically placed between the floating marking guide 6 and the main body 2. The marking tool tip is shown protruding thru the center slot in floating marking guide 6. Sliding plane marking guide 3 is being forced against work piece 8 wedging it against main body 2 by force created by stretched bands 5 and 5A that are attached to the sliding plane marking guide 3. Stretchable bands 5 and 5A are looped thru holes 11 and 12, respectively, located on opposite ends of end piece 1 and around the attaching points 31 and 32 on sliding plane marking guide 3.

Figure 4:
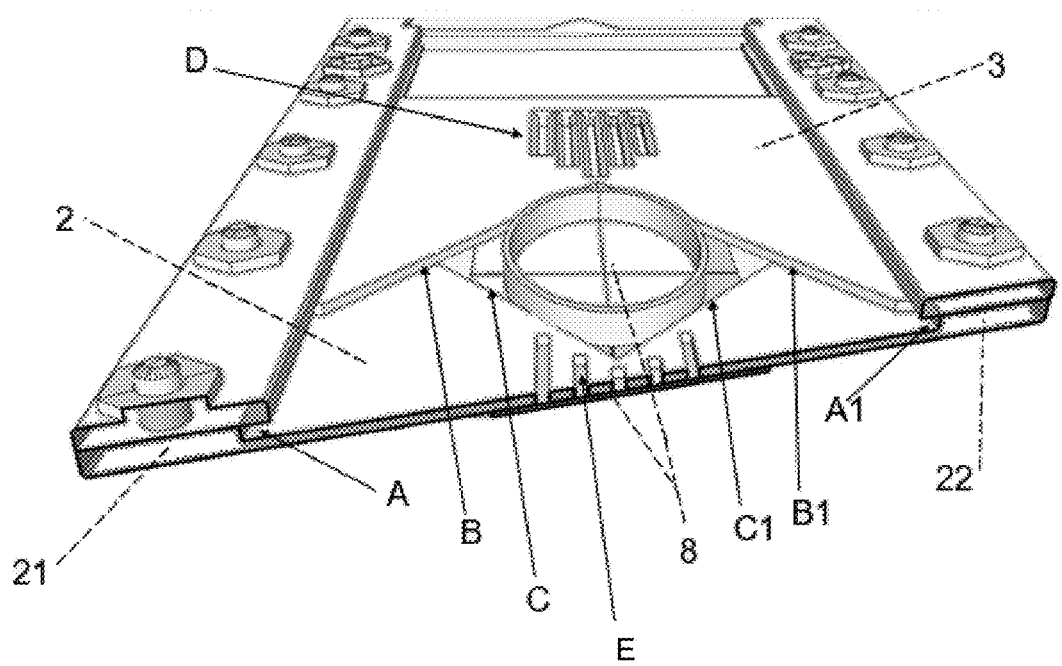
FIG. 4 shows a bottom isometric view of the invention illustrating the sliding plane holding the work piece against the fixed plate.

FIG. 4 shows a more detailed bottom view of a cross-section of main body 2 illustrating where the sliding plane marking guide 3 is positioned in channels A and A1 that are located longitudinally in the inner edges of main body 2. The sliding plane marking guide 3 is positioned with vertical leading edges B and B1 wedging work piece 8 against vertical edges C and C1 of main body 2. A plurality of elongated slots D in sliding marking guide 3 and a plurality of elongated slots E in the main body 2 are used for marking on the front of the work piece. See also FIG. 2 for elongated slots D and E.

Figure 5:
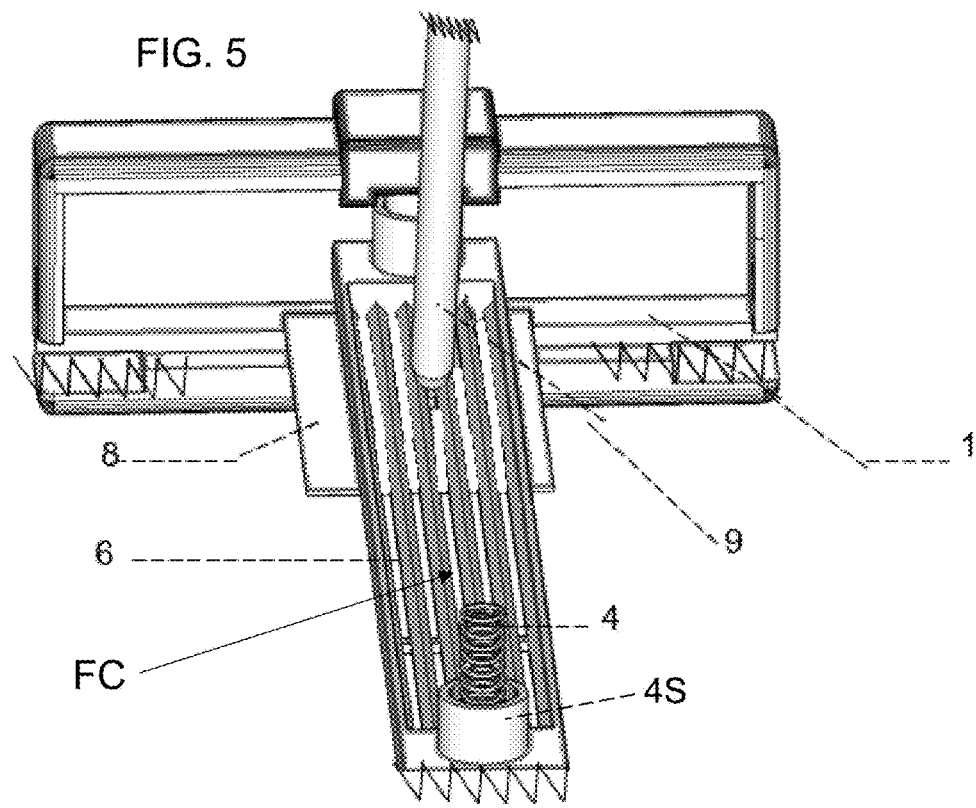
FIG. 5 shows a top isometric view of invention of the marking tool making a mark on work piece.

Shown in further detail in FIG. 5 is a partial top view illustrating marking tool 9 positioned with marking end protruding thru the floating marking guide 6 center slot FC making a mark on the back of work piece 8. It also shows the location of spring 4 on floating marking guide 6, and a spring housing 4S for holding spring 4 in place on floating marking guide 6. The opposite end of floating marking guide 6 is similarly constructed. End piece 1 is engaged with floating marking guide 6 which keeps floating marking guide 6 aligned correctly.

Figure 6:
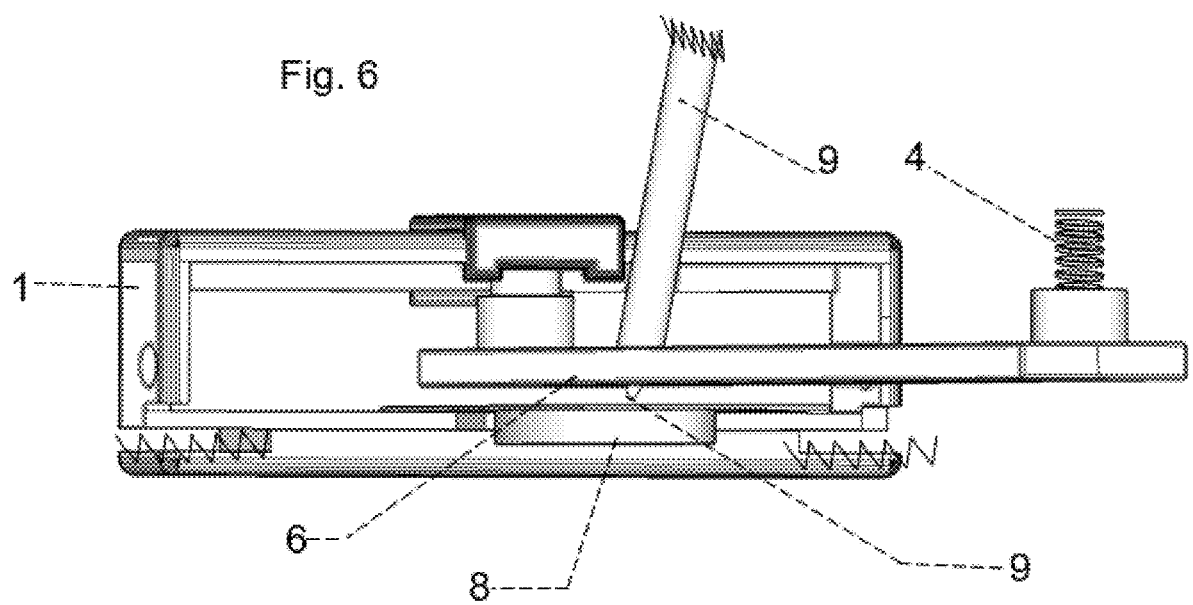
FIG. 6 shows a left side low-angled view of the invention illustrating marking of the work piece thru a slot in the upper floating marking guide.

FIG. 6 shows a partial front view illustrating marking tool 9 positioned with marking end protruding thru the floating marking guide 6 center slot making a mark on the back of work piece 8. It also shows the location of spring 4 on floating marking guide 6.

Figure 7:
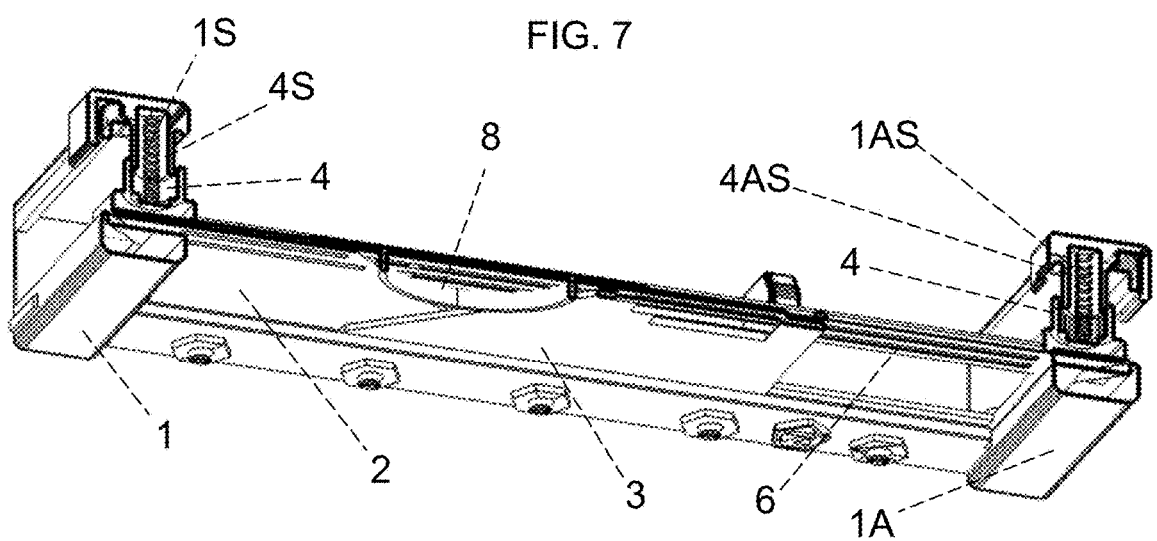
FIG. 7 shows a bottom isometric cutaway view of the invention holding a work piece.

Shown in more detail in FIG. 7 is a bottom isometric cutaway view of the preferred embodiment of the invention holding work piece 8, where end piece 1 and end piece 1A are positioning floating marking guide 6 in main body 2. The springs 4 and 4A are shown inside spring housings 1S and 1AS, which are hollow alignment columns, attached to end piece 1 and piece 1A where end piece 1 and end piece 1A are slid onto ends of floating marking guide 6. Housing 1S and 1AS are configured to slide down into housing 4S and 4AS, respectively, thereby holding springs 4 and 4A in place. Also shown is sliding marking guide 3 holding work piece 8 positioned against main body 2.

Those skilled in the art will understand that the purpose of the springs and alignment columns is to keep a downward pressure on the floating marking guide and to constrain the floating marking guide to move in the vertical direction and avoid any motion toward the side rails, so as to keep the elongated slots on the floating marking guide in alignment with those below. Further, although the hollow alignment columns are shown as cylinders, they could just as well have some other shape, e.g. they could be square or rectangular, open on the sides or closed on the sides, or even some other shape as long as they constrain the motion of the floating marking guide as described above.

Figure 8:
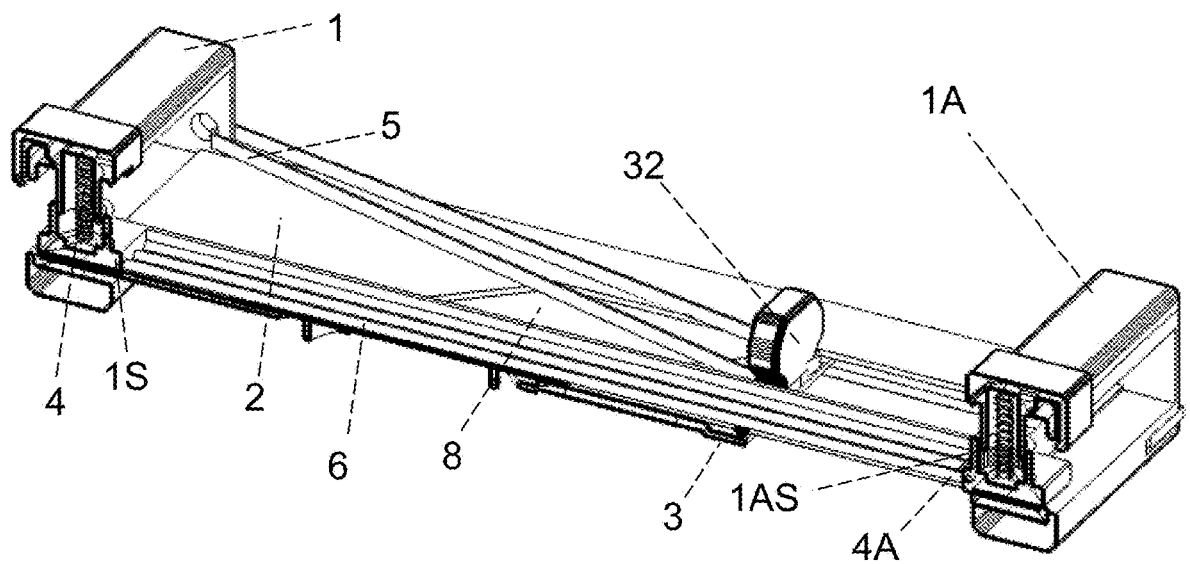
FIG. 8 shows a top isometric cutaway view of the invention holding work piece.

FIG. 8 is a top isometric cutaway view showing the invention holding work piece 8, where the stretchable band 5 is attached to end 1 and around attachment element 32 of the sliding marking guide 3, causing work piece 8 to be aligned parallel to the center slots of floating marking guide 6. The ends 1 and 1A are positioning floating marking guide 6 in main body 2. The springs 4 and 4A are shown inside the housing 1S and 1AS as in FIG. 7. Also shown is sliding marking guide 3 holding work piece 8 positioned against main body 2.

The advantages of the present invention include, without limitation, enabling the person who is joining components by soldering, gluing, or welding and needs them to be aligned with precision, where a mark on the front and/or back is aligned with the centerline of another component, like a bezel or protrusion. It enables the user to make alignment marks without using the customary and cumbersome measuring tools typically used to serve this function.

In broad embodiment, the present invention is a tool for making alignment marks on the front and/or back of a piece being joined, where parallel alignment is necessary.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

The invention claimed is:

1. A tool for aligning a work piece, the work piece having a raised area that is symmetric about a centerline, so that the work piece can be marked along a line parallel with the centerline, said tool comprising:
   a first end housing;
   a second end housing;
   a fixed plate with a rectangular shape having a first end attached to said first end housing, said fixed plate having a symmetric vee-shaped cutout opposite said first end creating a first set of edges of said fixed plate in said vee-shaped cutout, said vee-shaped cutout having an apex pointing toward said first end housing and defining a first direction, and said fixed plate having a plurality of elongated slots parallel with said first direction, with at least one of said plurality of elongated slots directly in line with the apex of said vee-shaped cutout;
   said fixed plate further comprising two side rails, each side rail attached to said first end housing and to said second end housing, wherein said two side rails are parallel with said first direction and extending past said vee-shaped cutout in a direction opposite said first direction with said vee-shaped cutout therebetween, said side rails having cs therein;
   a sliding plane extending between said side rails having a symmetric vee-shaped cutout on one end creating a set of edges of said sliding plane in said vee-shaped cutout, the set of edges of said sliding plane hereinafter called a second set of edges, said vee-shaped cutout on said sliding plane oriented in a direction opposite said vee-shaped cutout on said fixed plate, said sliding plane having a plurality of elongated slots in alignment with said plurality of elongated slots in said fixed plate;
   said sliding plane moveably captured in said channels in said side rails, said channels configured to enable said sliding plane to slide under said fixed plate between said side rails in a direction parallel to said first direction, wherein said sliding plane can be moved relative to said fixed plate to create an open area between said vee-shaped cutout on said sliding plane and said vee-shaped cutout on said fixed plate, the open area being where said raised area of said work piece can be held in place between said first set of edges and said second set of edges.

2. The tool of claim 1 further comprising a restraining element creating a force in said first direction on said sliding plane to hold said raised area of said workpiece in place between said first set of edges and said second set of edges.

3. The tool of claim 2 wherein said restraining element comprises a stretchable band.

4. The tool of claim 2 wherein said restraining element comprises a spring.

5. The tool of claim 1 further comprising:
   a floating marking guide located above said fixed plate and having a flat side facing said fixed plate and a second side opposite said flat side, said floating marking guide having a first end and a second end, said first end of said floating marking guide moveably captured inside said first end housing thereby permitting motion of said first end of said floating marking guide perpendicular to said fixed plate, and said second end of said floating marking guide moveably captured inside said second end housing thereby permitting motion of said second end of said floating marking guide perpendicular to said fixed plate, said floating marking guide having a plurality of elongated slots aligned with said plurality of slots on said fixed plate and said plurality of slots on said sliding marking guide.

6. The tool of claim 5 further comprising a first spring, said first spring having two ends with one end opposite the other end; and
   wherein said floating marking guide has a first vertical column on said first end on said second side, said first vertical column configured to capture one end of said first spring and to constrain said first spring to move in a direction perpendicular to said flat side of said floating marking guide; and
   wherein said first end housing has a first end vertical column configured to capture the opposite end of said first spring and to constrain said opposite end of said first spring to move in a direction perpendicular to said flat side of said floating marking guide and to mate with said first vertical column on said first end of said floating marking guide causing a downward force on said floating marking guide.

7. The tool of claim 6 further comprising a second spring, said second spring having two ends with one end opposite the other end; and
   wherein said floating marking guide has a second vertical column on said second end on said second side, said second vertical column configured to capture one end of said second spring and to constrain said second spring to move in a direction perpendicular to said flat side of said floating marking guide; and
   wherein said second end housing has a second end vertical column configured to capture the opposite end of said second spring and to constrain said opposite end of said second spring to move in a direction perpendicular to said flat side of said floating marking guide and to mate with said second vertical column on said second end of said floating marking guide causing a downward force on said floating marking guide.

8. The tool of claim 6 further comprising a restraining element creating a force in said first direction on said sliding plane to hold said raised area of said workpiece in place between said first set of edges and said second set of edges.

9. The tool of claim 8 wherein said restraining element comprises a stretchable band.

10. The tool of claim 8 wherein said restraining element comprises a spring.

* * * * *